(12) United States Patent
    Bajikar

(10) Patent No.: US 7,260,835 B2
(45) Date of Patent: Aug. 21, 2007

(54) BLUETOOTH™ BASED SECURITY SYSTEM

(75) Inventor: Sundeep M. Bajikar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 09/883,403

(22) Filed: Jun. 19, 2001

(65) Prior Publication Data

US 2002/0194500 A1    Dec. 19, 2002

(51) Int. Cl.
*H04L 9/00* (2006.01)
*G06F 15/16* (2006.01)
*G06F 21/20* (2006.01)

(52) U.S. Cl. .................. 726/4; 726/1; 726/14
(58) Field of Classification Search ........ 713/200–202; 705/56; 340/568.1, 571, 426.18, 426.19
See application file for complete search history.

(56) References Cited

U.S. PATENT DOCUMENTS

| | | | | |
|---|---|---|---|---|
| 5,963,134 A * | 10/1999 | Bowers et al. ............ | 340/572.1 |
| 6,317,028 B1 * | 11/2001 | Valiulis ...................... | 340/10.1 |
| 6,418,533 B2 * | 7/2002 | Angelo et al. .............. | 713/202 |
| 6,433,685 B1 * | 8/2002 | Struble et al. .............. | 340/571 |
| 6,574,455 B2 * | 6/2003 | Jakobsson et al. ......... | 455/41.2 |
| 6,609,656 B1 * | 8/2003 | Elledge ...................... | 235/382 |
| 6,647,497 B1 * | 11/2003 | Cromer et al. .............. | 713/200 |
| 6,771,933 B1 * | 8/2004 | Eng et al. ................... | 455/41.2 |
| 6,772,331 B1 * | 8/2004 | Hind et al. .................. | 713/151 |
| 6,778,809 B2 * | 8/2004 | Morimoto ................... | 455/11.1 |
| 6,785,542 B1 * | 8/2004 | Blight et al. ............. | 455/426.1 |
| 2003/0051052 A1 * | 3/2003 | Shteyn et al. ............... | 709/245 |
| 2003/0092383 A1 * | 5/2003 | Moles et al. ................ | 455/41 |
| 2003/0095524 A1 * | 5/2003 | Stephens et al. ........... | 370/338 |
| 2004/0109441 A1 * | 6/2004 | Hur et al. ................... | 370/352 |
| 2005/0057370 A1 * | 3/2005 | Warrior et al. ........ | 340/870.01 |
| 2005/0076242 A1 * | 4/2005 | Breuer ...................... | 713/201 |
| 2005/0283645 A1 * | 12/2005 | Turner et al. ................ | 714/4 |
| 2006/0236364 A1 * | 10/2006 | Suni et al. ..................... | 726/1 |

OTHER PUBLICATIONS

Gehmann, "Bluetooth Security White Paper", Apr. 19, 2004, Bluetooth SIG Security Expert Group, p. 1-46.*
Miller, "Mapping Salutation Architecture APIs to Bluetooth Service Discovery Layer", Jul. 1, 1999, Bluetooth Special Interest Group, p. 1-26.*
Johansson et al, "JUMP Mode—A Dynamic Window-Based Scheduling Framework for Bluetooth Scatternets", Oct. 2001, ACM, p. 204-211.*

* cited by examiner

*Primary Examiner*—Christopher Revak
(74) *Attorney, Agent, or Firm*—Cyndi M. Wheeler

(57) ABSTRACT

A Bluetooth based security system utilized to provide ad-hoc security services to secured assets. Such a Bluetooth based security system comprises a secured device (SD) equipped with Bluetooth (BT) technology; a plurality of Bluetooth Access Points (BTAPs) located at designated points to establish a BT link with the secured device (SD); and a security server (SS) connected to all BTAPs and arranged to provide access control and security services for the secured device (SD), wherein the security server (SS) obtains attribute information of the secured device (SD), including an unique device identification (ID) and a last known location of the secured device (SD), activates a lock with the secured device (SD), and sends location information of a designated BTAP and an unlock code to the secured device (SD), via the designated BTAP.

30 Claims, 6 Drawing Sheets

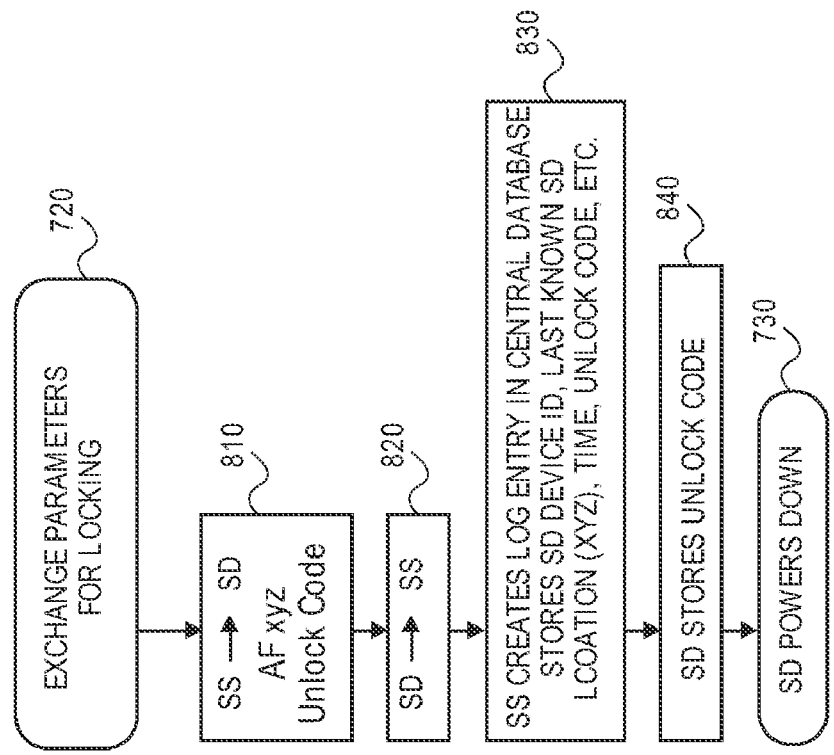
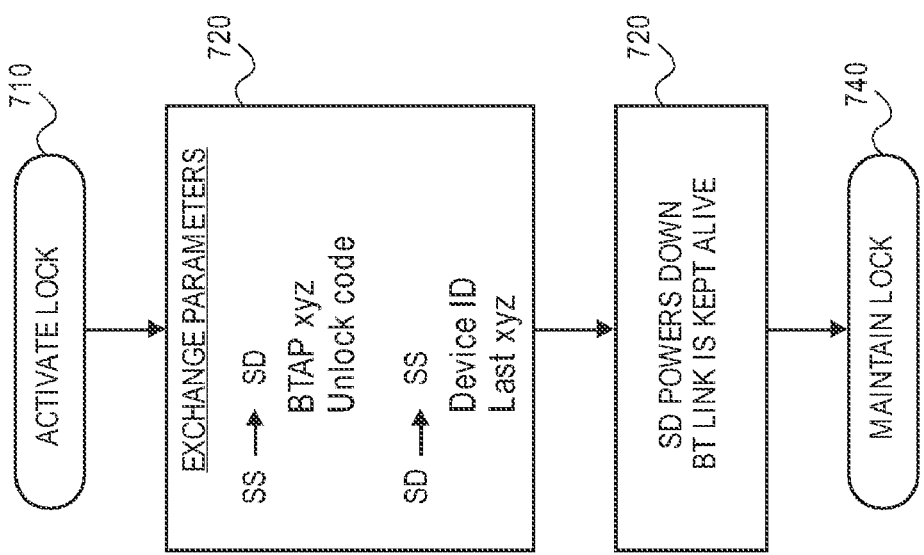

BLUETOOTH™ BASED SECURITY SYSTEM

TECHNICAL FIELD

The present invention relates to a security system, and more particularly, relates to an adhoc security system for electronic devices such as portable computers equipped with Bluetooth™ for providing access control, tracking and security services of varying complexity without any additional hardware overheads.

BACKGROUND

Electronics devices such as notebook and laptop computers have become increasingly compact and portable and, as a result, increasingly vulnerable to unauthorized use, theft or loss. This is because these portable computers are small, expensive and may contain very valuable information.

Many computers, especially portable computers, have been secured from unauthorized use, theft or loss by mechanisms based on principles of prevention, deterrence or recovery. Prevention mechanisms may include physical locking devices which lock portable computers to docking stations. Deterrence mechanisms may include myriad alarm systems which employ various deterrence methods, including sound and visual alarms to deter an unauthorized person or a thief from stealing the portable computers. Recovery mechanisms may include various systems for providing automatic disabling of portable computers and/or for locating and tracking stolen portable computers for recovery via existing radio communication infrastructures or existing cellular network infrastructures.

One typical example of computer tracking systems for locating stolen computers is the use of a software (location tracking program) installed to instruct the computer to call a third party monitoring service at regular intervals. When the computer calls the monitoring service, the computer establishes a data link and transmits data to the monitoring service that identifies the computer. When the monitoring service receives a call from the user's computer, the monitoring service is able to determine the location of the computer by utilizing Caller ID. The location of the computer may then be forwarded to a law enforcement agency so that the lost or stolen computer can be retrieved by the law enforcement agency.

Alternatively, the location tracking program may also be installed to identify if an e-mail is being sent from the lost or stolen computer and compare a sender address to a predetermined owner address. If the sender address matches the owner address, the e-mail is sent unimpeded. However, if the sender address does not match with the sender address, then the e-mail is redirected to a third party such as a law enforcement agency to notify that the computer may have been stolen. However, such location tracking systems are not optimal because a third party monitoring service is required.

Another example location tracking systems are known as Radio Frequency Identification (RFID) systems which are available to uniquely identify and track devices equipped with RFID tags as disclosed, for example, in U.S. Pat. No. 6,232,870 for Applications For Radio Frequency Identification Systems issued to Garber et al., U.S. Pat. No. 6,100,804 for Radio Frequency Identification System issued to Brady et al., U.S. Pat. No. 5,963,134 for Inventory System Using Articles With RFID Tags issued to Bowers et al., and U.S. Pat. No. 5,838,253 for Radio Frequency Identification Label issued to Wurz et al. A typical RFID tag (also known as transponder) consists of a semiconductor chip having RF circuits, control logic, memory and an antenna (and a battery in the case of active tags) mounted to a substrate for providing remote identification. However, such RFID systems require dedicated wireless communications, and contain no general wireless data communications capabilities. Another drawback is that the user has purchase the RFID tags, the tag reader, and setup the environment specifically for the RFID service. RFID tags can also be cost prohibitive as each RFID tag can vary from 50 cents to $150 based on the desired capabilities.

Accordingly, there is a need for a new type of asset security and wireless tracking system for electronic devices such as portable computers that can be easily and effectively implemented with an industry standard communications wireless technology such as Bluetooth™ to provide access control, tracking and security services of varying complexity without any additional hardware overheads.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 7 illustrates an example lock activation procedure between a security server (SS) and a secured device (SD) of the Bluetooth™ based security system according to an embodiment of the present invention;

FIG. 8 illustrates an example parameter exchange procedure for locking between a security server (SS) and a secured device (SD) of the Bluetooth™ based security system according to an embodiment of the present invention;

DETAILED DESCRIPTION

Figure 1:
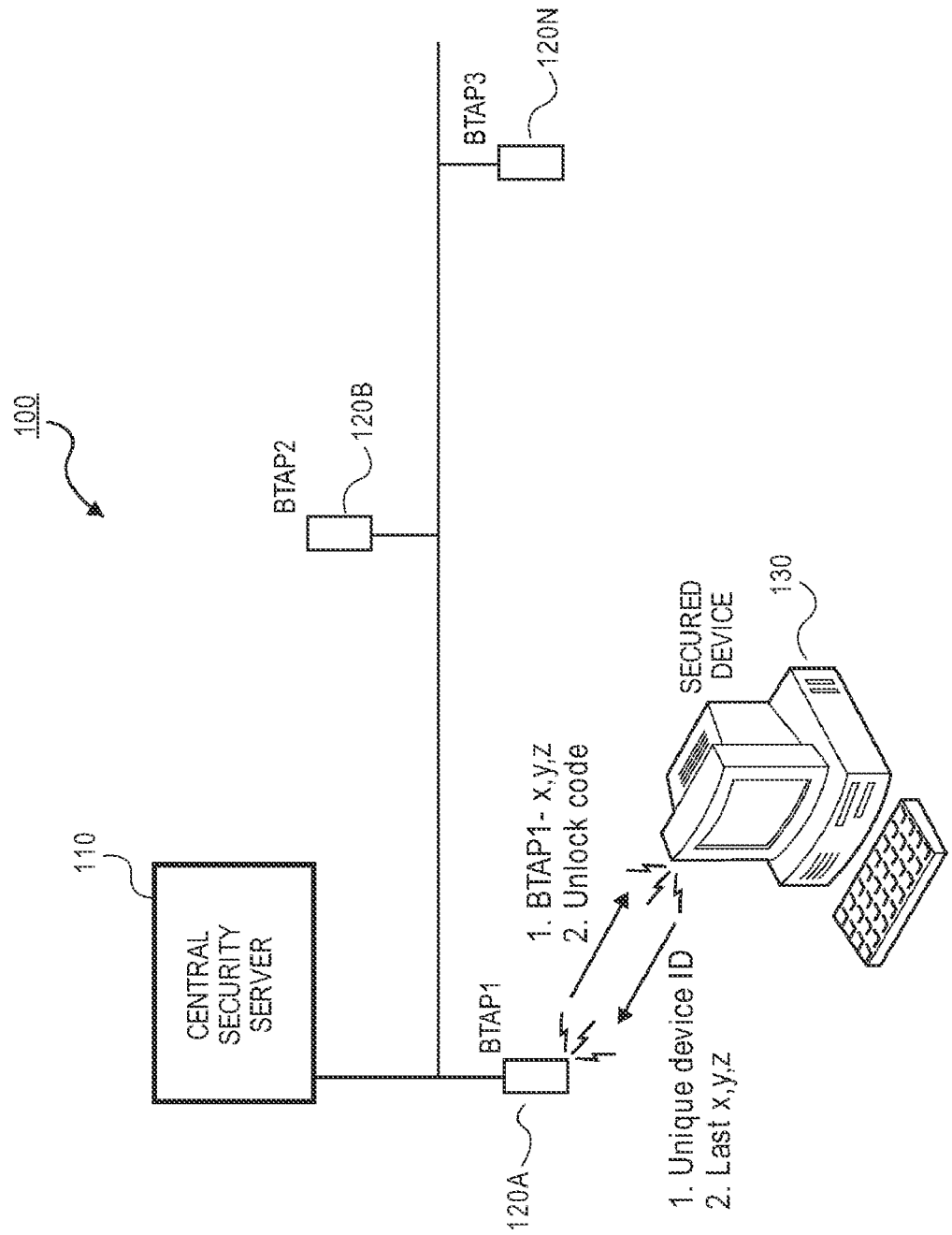
FIG. 1 illustrates an example Bluetooth™ based security system according to an embodiment of the present invention.

The present invention is applicable for use with all types of electronic devices, including mobile devices and portable computers using all forms of radio networks. Examples of such radio networks may include Bluetooth™ based radio systems and IEEE 802.11b standard based radio systems designed for connecting a variety of mobile devices in a secure ad-hoc fashion. However, for the sake of simplicity, discussions will concentrate mainly on an example Bluetooth™ based radio system for providing ad-hoc security services of varying complexity for electronic devices equipped with Bluetooth technology, although the scope of the present invention is not limited thereto.

As set forth in the "*Specification of the Bluetooth System*" by the Bluetooth Special Interest Group (SIG) at http://www.bluetooth.com/, Bluetooth™ wireless technology is a lowcost, low-power, short-range radio link for mobile devices and for WAN/LAN access points to offer fast and reliable digital transmissions of both voice and data over the globally available 2.4 GHz ISM (Industrial, Scientific and Medical) band without the need for a central network. Current Bluetooth™ based systems may provide up to 100-meter range capability (but extendable to more than 100 meters) and an asymmetric data transfer rate of 721 kb/sec between mobile devices and fixed voice/data access points (known as Bluetooth Access Points "BTAPs").

The Bluetooth™ protocol supports a maximum of three voice channels for synchronous, CVSD-encoded transmission at 64 kb/sec, and treats all radios as peer units identified by unique 48-bit addresses in compliance with the Bluetooth specification. At the start of any connection, the initiating device is a temporary master. This temporary assignment, however, may change after initial communications are established. Each master device may have active connections of up to seven slave devices. Such a connection between a master device and one or more slave devices forms a "piconet." Link management allows communication between piconets, thereby forming "scattemets." Typical Bluetooth™ master devices include cordless phone base stations, local area network (LAN) access points, laptop computers, or bridges to other networks. Bluetooth™ slave devices may include cordless handsets, cell phones, headsets, personal digital assistants, digital cameras, or computer peripherals such as printers, scanners, fax machines and other electronic devices.

Bluetooth™ protocol also utilizes time-division duplex (TDD) to support bi-directional communications between mobile devices and BTAPs. Frequency hopping spread-spectrum technology accommodating frequency diversity permits operation in noisy environments and permits multiple piconets to exist in close proximity. This is so since frequency diversity is inherent in frequency hopping, especially when it is wide, as in the case of Bluetooth™ (spread over a band of about 80 MHz). The frequency hopping transmission hops at a rate of 1600 hops per second over 791-MHz channels between 2402 MHz and 2480 MHz. Various error-correcting schemes permit data packet protection by ⅓- and ⅔-rate forward error correction.

Attention now is directed to the drawings and particularly to FIG. 1, an example Bluetooth™ based security system according to an embodiment of the present invention is illustrated. Such a Bluetooth™ based security system may be installed in a designated area such as a company site, a school, a building or an industry complex to provide ad-hoc security services for electronic devices such as portable computers equipped with Bluetooth (BT) without the need for cables, chains or other mechanical components. The Bluetooth™ based security system serves to control and monitor the status of all secured devices or assets remotely, through the Internet or other networks whenever possible.

As shown in FIG. 1, the Bluetooth™ based security system 100 comprises a central security server (SS) (also known as "security provider") 110, a network of Bluetooth (voice/data) Access Points (BTAPs) 120A-120N and one or more secured devices (SD) 130 equipped with Bluetooth™ technology. All BTAPs 120A-120B may be strategically located at designated points where users are most likely to secure BT equipped devices temporarily (or permanently). The BTAPs 120A-120N may server to connect a secured device (SD) 130 to a communicating device via a secure (private) wireless link. For example, a secured device (SD) 130 such as a portable computer equipped with Bluetooth™ technology may link to a mobile phone (for example) that uses Bluetooth™ technology to connect to the Internet to access e-mail. Each BTAP 120A-120N may be installed at a pre-surveyed (known) location to establish a BT link for communication with the secured device (SD) 130 and enabling the secured device (SD) 130 to access the security server (SS) 110 and the Internet, for example.

The central security server 110 may be connected directly or indirectly to all the BTAPs 120A-120N in the network, and may serve as a central point relative to the physical structure that houses the network of BTAPs 120A-120N. The central security server 110 may be connected to the Internet or other networks to provide security services, including remote monitoring and tracking of the secured device (SD) 130.

Figure 2:
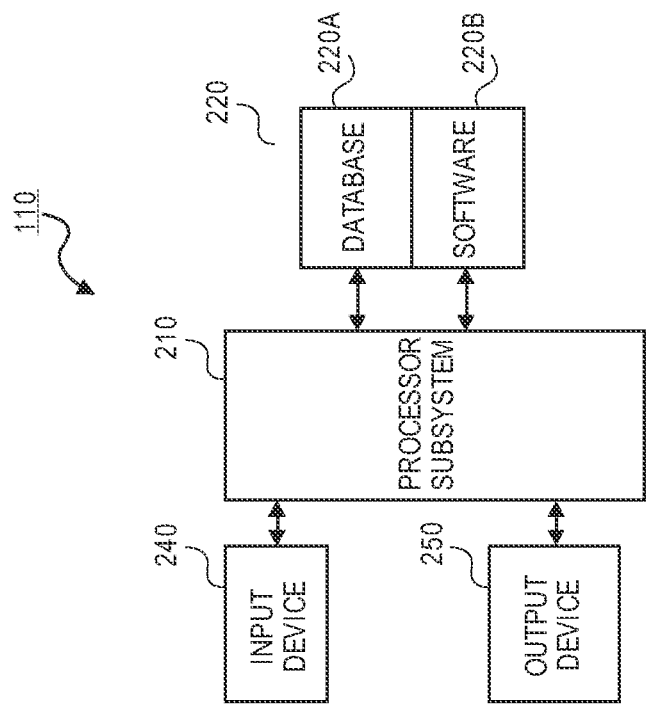
FIG. 2 illustrates an example system platform of a security server (SS) according an embodiment of the present invention.

FIG. 2 illustrates an example system platform of a security server (SS) 110 according an embodiment of the present invention. As shown in FIG. 2, the secured server (SS) 110 may include, but not limited to, a processor subsystem 210, a data storage subsystem 220, and an I/O subsystem including an input device 240 and an output device 250.

The processor subsystem 210 may include one or more processors or central processing units (CPUs) such as Intel® i386, i486, Celeron™ or Pentium® processors. The data storage subsystem 220 may include a volatile memory (e.g., random-access-memory "RAM") for database 220A and a non-volatile memory (e.g., read-only-memory "ROM") for containing a security control software 220B to provide ad-hoc security services, including remote monitoring and tracking of secured assets (i.e., secured device 130) of the Bluetooth™ based security system 100, including searching and capturing the location of the lost or stolen secured device (SD) 130. The input device 240 may include a keyboard controller for controlling operations of an alpha-numeric keyboard, a cursor control device such as a mouse, track ball, touch pad, joystick, and bar code reader for enabling an IT administrator (for example) to install the security control software 220B and change system settings and configurations. The output device 250 may include a printer, a display monitor, speakers and network devices for establishing connections with the Internet or other networks to provide security services, including remote monitoring and tracking of the secured device (SD) 130.

Figure 3:
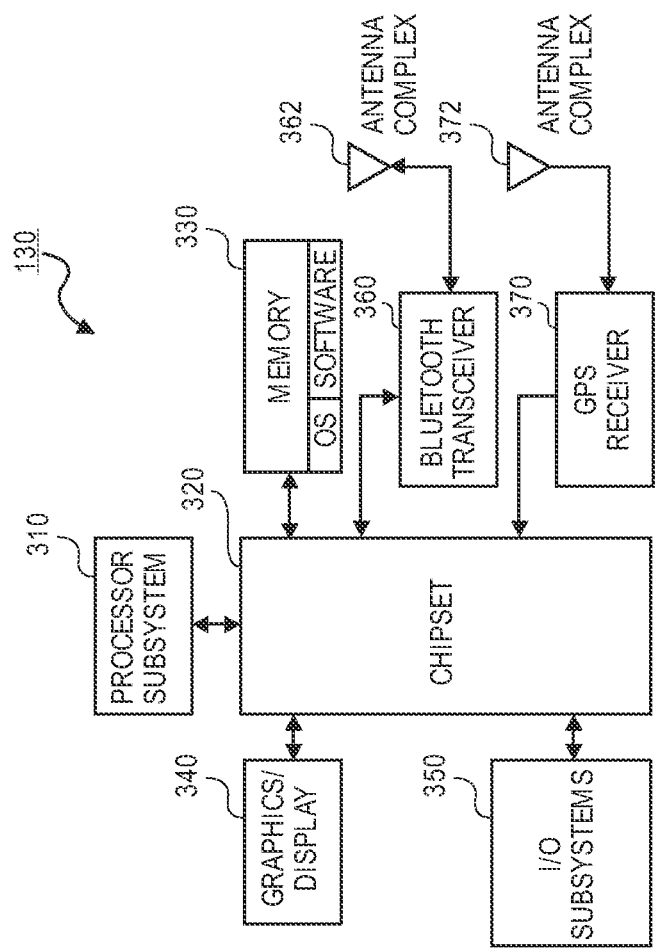
FIG. 3 illustrates an example system platform of a secured device (SD) such as a portable computer according an embodiment of the present invention.

FIG. 3 illustrates an example system platform of a secured device (SD) 130 such as a portable computer according an embodiment of the present invention. As shown in FIG. 3, the secured device (SD) 130 may include, but not limited to, a processor subsystem 310, a host chipset 320, a memory 330 connected to the host chipset 320, a graphics/display subsystem 340 connected to the host chipset 320, the I/O subsystem 350 connected to the host chipset 320, a Bluetooth transceiver 360 including an antenna complex 362 arranged to establish communication with any of the BTAPs 120A-120N for security services and optionally, a Global Positioning System (GPS) receiver 370 including an antenna complex 372 or other satellite or land-based network arranged to provide radio positioning and navigation needs, including receiving information relating to the location or position of the secured device (SD) 130 relative to the BTAPs 120A-120N and determining a change in distance between the secured device (SD) 130 and a particular BTAP (e.g., ranging measurement from the BTAP).

The processor subsystem 310 may also include one or more processors or central processing units (CPUs) such as Intel® i386, i486, Celeron™ or Pentium® processors.

The memory 330 may correspond to a dynamic random-access-memory (DRAM), but may be substituted for read-only-memory (ROM), video random-access-memory (VRAM) and the like. Such a memory 330 may store an operating system (OS) 330A such as Windows™ 95/98 and Windows™ 2000 for use by the processor subsystem 310, and information and instructions such as a security control software 330B for activating/deactivating a lock with the BTAPs 120A-120N of the Bluetooth™ based security system 100.

The graphics/display subsystem 240 may include, for example, a graphics controller, a local memory and a display monitor (e.g., cathode ray tube, liquid crystal display, flat panel display, etc.).

The IO subsystem 250 may provide an interface with a variety of I/O devices and the like, such as: a Peripheral Component Interconnect (PCI) bus (PCI Local Bus Specification Revision 2.2 as set forth by the PCI Special Interest Group (SIG) on Dec. 18, 1998) which may have one or more I/O devices connected to PCI slots, an Industry Standard Architecture (ISA) or Extended Industry Standard Architecture (EISA) bus option, and a local area network (LAN) option for communication peripherals such as telephone/fax/modem adapters, answering machines, scanners, personal digital assistants (PDAs) etc; a super I/O chip (not shown) for providing an interface with another group of I/O devices such as a mouse, keyboard and other peripheral devices; an audio coder/decoder (Codec) and modem Codec; a plurality of Universal Serial Bus (USB) ports (USB Specification, Revision 2.0 as set forth by the USB Special Interest Group (SIG) on Apr. 27, 2000); and a plurality of Ultra/66 AT Attachment (ATA) 2 ports (X3T9.2 948D specification; commonly also known as Integrated Drive Electronics (IDE) ports) for receiving one or more magnetic hard disk drives or other I/O devices.

The USB ports and IDE ports may be used to provide an interface to a hard disk drive (HDD) and compact disk read-only-memory (CD-ROM). I/O devices may include, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

The host chipset 220 may correspond to, for example, in Intel® 810, Intel® 870 and 8XX series chipsets which include, for example, a memory controller hub (MCH) for controlling operations of the main memory 330 and an IO controller hub (ICH) for controlling operations of a variety of I/O devices, via standard PCI, ISA or EISA bus.

Figure 4:
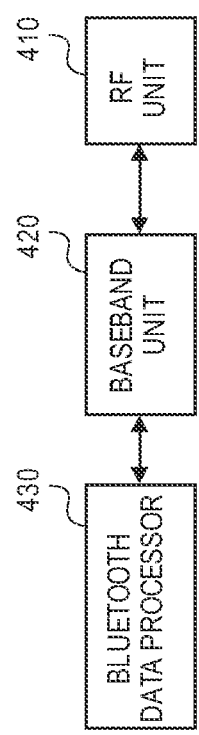
FIG. 4 illustrates an example Bluetooth transceiver of the secured device (SD) according to an embodiment of the present invention.

The Bluetooth transceiver 360 contains an identification (ID) number unique to the secured device (SD) 130 for identification and lock-in communication with any one of the BTAPs 120A-120N strategically located at designated points where the secured device (SD) 130 is most likely secured temporarily (or permanently). Such a Bluetooth transceiver 360 typically provides compatibility between the radio waves used in the Bluetooth™ based security system 100. As shown in FIG. 4, the Bluetooth transceiver 360 typically includes a radio-frequency (RF) unit 410 arranged to transmit/receive radio waves to/from any one of the BTAPs 120A-120N, via the antenna complex 362; a baseband unit 420 arranged to establish link set-up (control) and support for link management between the secured device (SD) 130 and the BTAPs 120A-120N in compliance with the "*Specification of the Bluetooth System*", including user authentication and link authorization; and optionally, a Bluetooth data processor 430 arranged to process sample Bluetooth data, including the location of the last BTAP that the secured device (SD) 130 connected thereto.

In one example embodiment, the Bluetooth transceiver 360 can determine information relating to the location or position of the secured device (SD) 130 relative to the BTAPs 120A-120N by communicating with several BTAPs 120A-120N.

Figure 5:
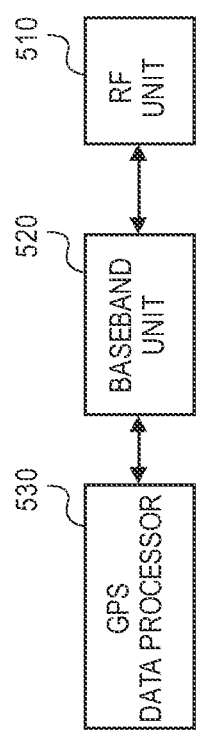
FIG. 5 illustrates an example GPS receiver (sensor) of the secured device (SD) according to an embodiment of the present invention.

The GPS receiver (sensor) 370 may be part of an accurate three-dimensional global positioning satellite (GPS) system to provide radio positioning and navigation needs. As shown in FIG. 5, the GPS receiver 370 may also include a radio-frequency (RF) unit 510 arranged to receive GPS data from a plurality of GPS satellites (not shown), via the antenna complex 372; a baseband unit 520 arranged to sample GPS data; and optionally, a GPS data processor 530 arranged to process sample GPS data relating to the location or position of the secured device (SD) 130 relative to the BTAPs 120A-120N and determine a change in distance between the secured device (SD) 130 and a particular BTAP (e.g., ranging measurement from the BTAP).

More specifically, the GPS receiver 370 may track pseudo-random noise from a plurality of GPS satellites, via the antenna complex 372 and generate therefrom time-of-arrival values. Thereafter, the GPS data processor 530 may sample the time-of-arrival values from the GPS constellation for each of the GPS satellites (not shown) and multiply the sample data by the speed of light to produce a plurality of pseudo-range measurements. The GPS data processor 530 then adjusts these pseudo-range measurements to compensate for deterministic errors such as the difference between each satellite's clock and GPS system time, atmospheric distortion of GPS signals and other considerations such as relativity factors. The GPS data processor 530 may include an instruction set which gathers the information necessary to compute adjustments to the pseudo-range measurements from a 50 Hz digital data stream which the GPS satellites broadcast along with their precision and coarse acquisition code. After the GPS data processor 530 makes all the necessary adjustments to the pseudo-range measurements, the position/time solution process may then be performed to determine the present GPS receiver antenna position. The GPS data processor 530 may compute its X, Y, Z position fix in terms of the World Geodetic System adapted in 1984, which is the basis on which the GPS develops its worldwide common grid references. Generally, the X, Y, Z coordinates are converted to latitude, longitude and altitude map datum prior to output. The GPS position solution is intrinsically referenced to the electrical phase center of the antenna. Finally, the GPS data processor 520 may compute clock bias results which are one of the parameters to be considered in addition to the X, Y, Z coordinates. The clock bias may be computed in terms of the time offset of the clock in the GPS receiver 370 versus GPS system time. Accordingly, the secured device (SD) 130 receives the GPS position data which information is processed to establish the present position of the secured device (SD) 130 relative to the BTAPs 120A-120N.

Both the Bluetooth transceiver 360 and the GPS receiver 370 may be integrated into the host chipset 220 as system-on-chip designs that is compatible with ASIC (Application-Specific Integrated Circuit) design flows. Alternatively, the Bluetooth subsystem 260 and the GPS subsystem 270 may be separate "plug-and-play" modules or a single "plug-and-play" module, including the ASIC and passive components for communications over longer distances.

Figure 6:
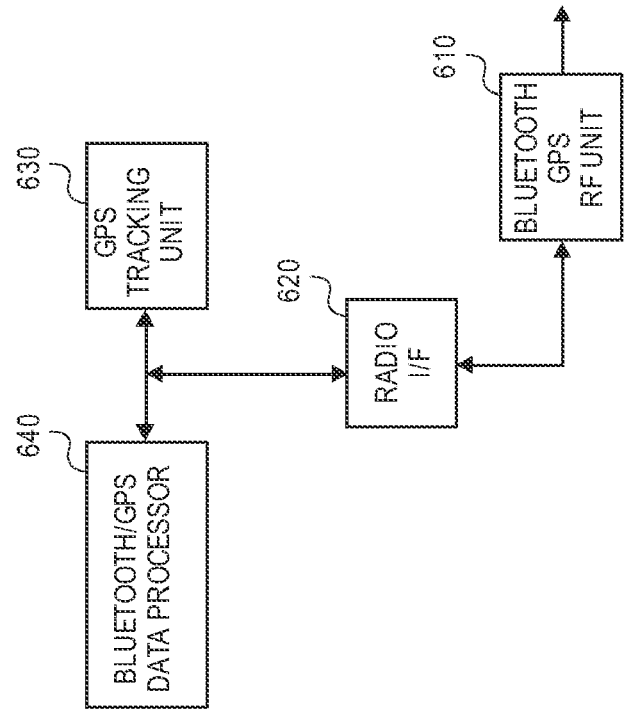
FIG. 6 illustrates an example Bluetooth and GPS subsystem of the secured device (SD) according to an embodiment of the present invention.

FIG. 6 illustrates an example Bluetooth and GPS subsystem 360 and 370 of the secured device (SD) 130 according to an embodiment of the present invention. As shown in FIG. 6, the Bluetooth and GPS subsystem may include, but not limited to, a Bluetooth/GPS radio-frequency (RF) unit 610, a radio interface 620, a GPS tracking unit 630, and a Bluetooth/GPS data processor 640. The Bluetooth/GPS radio-frequency (RF) unit 610 may track both GPS data (pseudo-random noise form a plurality of GPS satellites) and Bluetooth data, via an integrated antenna complex (not shown) under control of the GPS tracking unit 630. The Bluetooth/GPS data processor 640 may then process GPS data and Bluetooth data substantially the same way as described with reference to FIGS. 4 and 5.

Referring back to FIG. 1, the operation of the central security server (SS) 110, the BTAP 120A, for example, and the secured device (SD) 130 of the Bluetooth™ based security system 100 may be described as follows:

When a secured device (SD) 130 equipped with Bluetooth™ (also known as "client device") makes a BT connection with any of the BTAPs 120A-120N capable of providing security, two important attributes of the secured device (SD) 130 are captured by the BTAP 120A-120N and registered in the database 220A maintained at the central security server (SS) 1110 (see FIG. 2). These attributes includes (1) the unique device ID of the secured device (SD) 130, and (2) the last known location of the secured device (SD). The attributes may be derived from the location of the last BTAP 120A-120N that the secured device (SD) 130 connected thereto, or alternatively, may be obtained through an onboard GPS receiver 370.

The BTAP 120A, for example, may in turn provide its own (known) location (X, Y, Z coordinates) to the secured device (SD) 130. The secured device (SD) 130 may choose to use this information (X, Y, Z coordinates) in a variety of different ways. One of the ways, as mentioned above, is to provide this information to facilitate its next connection with another one of the BTAPs 120A-120N.

The central security server (SS) 110 may be configured, via the security control software 220B, to log the information provided by the BTAPs 120A-120N, to activate and maintain lock with the secured device (SD) 130, and provide an "unlock code" (which may be randomly selected) to the secured device (SD) 130 upon request from the secured device (SD) 130 for storage for future use, and subsequently notify the owner (user) of the secured device (SD) 130 if the secured device (SD) 130 is lost or stolen due to a BT disconnection.

The lock mechanism (i.e., security control software 220B and 330B shown in FIGS. 2-3) between the central security server (SS) 110, the BTAPs 120A-120N and the secured device (SD) 130 may be activated in two ways: (1) when the secured device (SD) 130 proactively requests that it be locked with the current BTAP 120A, as shown in FIG. 1; and (2) when the central security server (SS) 110 uses a predefined timeout value to engage the lock between the secured device (SD) 130 and the current BTAP 120A after the secured device (SD) 130 has established a BT connection with the current BTAP 120A. Typically the secured device (SD) 130 may be locked to the current BTAP 120A after the secured device (SD) 130 has established a BT connection with the current BTAP 120A for several minutes or more.

The lock mechanism consists of logging and maintaining the secured device (SD) 130 attributes specified above in a suitable database 220A at the central security server (SS) 110 (see FIG. 2 for example). After the central server (SS) 110 logs the secured device (SD) 130 attributes in its database 220A, an "unlock code" may be provided to the secured device (SD) 130 for storage for future use.

For a small fee (or no fee) the owner of the locked device (SD) 130 may remotely query the status of the secured asset(s). In addition, the central security server (SS) 110 can notify the owner (or security personnel) if any secured device (SD) 130 is "lost" through unauthorized disconnection.

After the secured device (SD) 130 has received the unlock code, the power supply to all internal components may be shut down, except those required to maintain the BT connection with the BTAPs 120A-120N.

The owner of the secured device (SD) 130 may disengage the lock by triggering it to send the unlock code to the central security server (SS) 110. The central security server (SS) then checks to make sure that the secured device (SD) 130 being unlocked is not in a search and arrest mode and removes the entry for the specified device, making the secured device (SD) 130 free to roam.

In the event of a theft, the security server (SS) 110 will note the broken BT link with the secured device (SD) 130, and notify appropriate personnel along with the last known position of the secured device (SD) 130. Additionally the security server (SS) 110 can initiate a network wide (or Internet wide) search and arrest request for the specified device ID and unlock code. If an attempt is made to use the stolen device 130, the stolen device 130 will first attempt to re-establish the BT connection that existed before it was stolen, using the stored unlock code. Until such a connection can be established, and the secured device (SD) 130 systematically unlocked, the secured device (SD) 130, if lost of stolen, will remain inoperable and serve as a theft deterrent.

Turning now to FIG. 7, an example lock activation procedure between a security server (SS) 110 and a secured device (SD) 130 of the Bluetooth™ based security system 100 according to an embodiment of the present invention is illustrated. As shown in FIG. 7, the Bluetooth™ based security system 100 activates the lock between the security server (SS) 110 and the secured device (SD) 130, via the BTAP 120A, at block 710, in two ways: (1) when the secured device (SD) 130 proactively requests to activate lock with the current BTAP 120A, or (2) when a pre-defined timeout value of the security server (SS) 110 is expired after the secured device (SD) 130 has established a BT connection with the current BTAP 120A.

Next, the security server (SS) 110 connected to the current BTAP 120A and the secured device (SD) 130 may proceed to exchange parameters for locking at block 720. At this time, the security server (SS) 110 transmits two items to the secured device (SD) 130, via the current BTAP 120A through the BT link, including the location information (X, Y, Z coordinates) of the current BTAP 120A and the unlock code to the secured device (SD) 130 for future use. In return, the secured device (SD) 130 transmits two items back to the security server (SS) 110, via the current BTAP 120A through the BT link, including the unique device ID of the secured device (SD) 130 and the last know location (X, Y, Z coordinates) of the secured device (SD) 130.

Afterwards, the secured device (SD) 130 may power down all internal components except those required to maintain the BT connection with the security server (SS) 110, via the current BTAP 120A at block 730. The lock between the security server (SS) 110 and the secured device (SD) 130 may then be maintained at block 740.

FIG. 8 illustrates an example parameter exchange procedure for locking between the security server (SS) 110 and a secured device (SD) 130 of the Bluetooth™ based security system 100 in more detail. During block 720 shown in FIG. 7, the security server (SS) 110 transmits two items to the secured device (SD) 130, via the current BTAP 120A through the BT link, including the location information (X, Y, Z coordinates) of the current BTAP 120A and the unlock code to the secured device (SD) 130 at block 810. The secured device (SD) 130 then transmits two items back to the security server (SS) 110, via the current BTAP 120A through the BT link, including the unique device ID of the secured device (SD) 130 and the last know location (X, Y, Z coordinates) of the secured device (SD) 130 at block 820. The security server (SS) 110 then creates log entry in its database 220A, stores the unique device ID of the secured device (SD) 130, the last known location (X, Y, Z coordinates) of the secured device (SD) 130, the time, and the unlock code etc., at block 830. The secured device (SD) 130 then stores the unlock code transmitted from the security server (SS) 110 at block 840 for future use. Afterwards, the secured device (SD) 130 powers down all internal components except those required to maintain the BT connection with the security server (SS) 110, via the current BTAP 120A at block 730.

Figure 9:
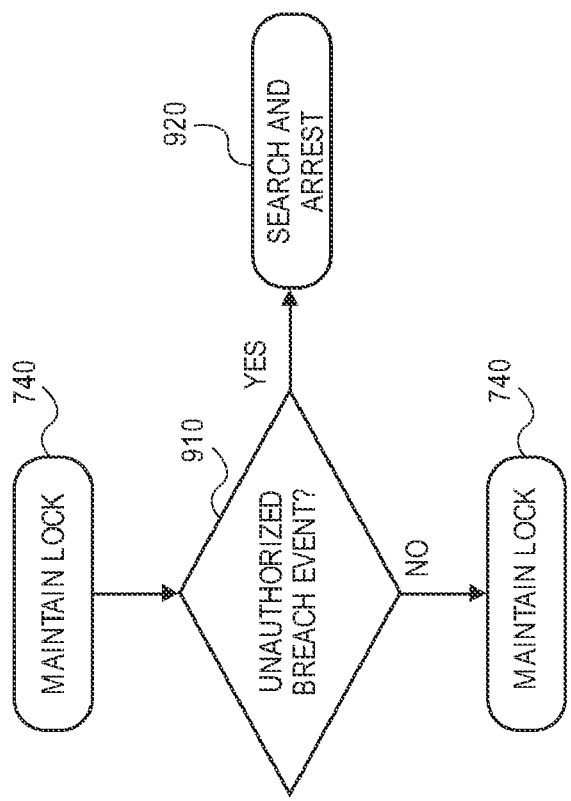
FIG. 9 illustrates an example lock maintenance procedure of the Bluetooth™ based security system according to an embodiment of the present invention.

FIG. 9 illustrates an example lock maintenance procedure of the Bluetooth™ based security system 100 according to an embodiment of the present invention. At block 910, if there is an occurrence of an unauthorized breach event during the time when the lock between the security server (SS) 110 and the secured device (SD) 130 is maintained at block 740, the security server (SS) 110 may assume that the secured device (SD) 130 is lost or stolen, and operate in a search and arrest mode to notify an appropriate personnel along with the last known position of the secured device (SD) 130 at block 920. An unauthorized breach event is triggered if there is an unauthorized BT disconnection with the secured device (SD) 130. The security server (SS) 110 can initiate a network wide (or Internet wide) search and arrest request for the specified device ID and unlock code. If an attempt is made to use the stolen device 130, the stolen device 130 will first attempt to re-establish the BT connection that existed before it was stolen, using the stored unlock code. Until such a connection can be established, and the secured device (SD) 130 systematically unlocked, the stolen device 130 will remain inoperable.

Figure 10:
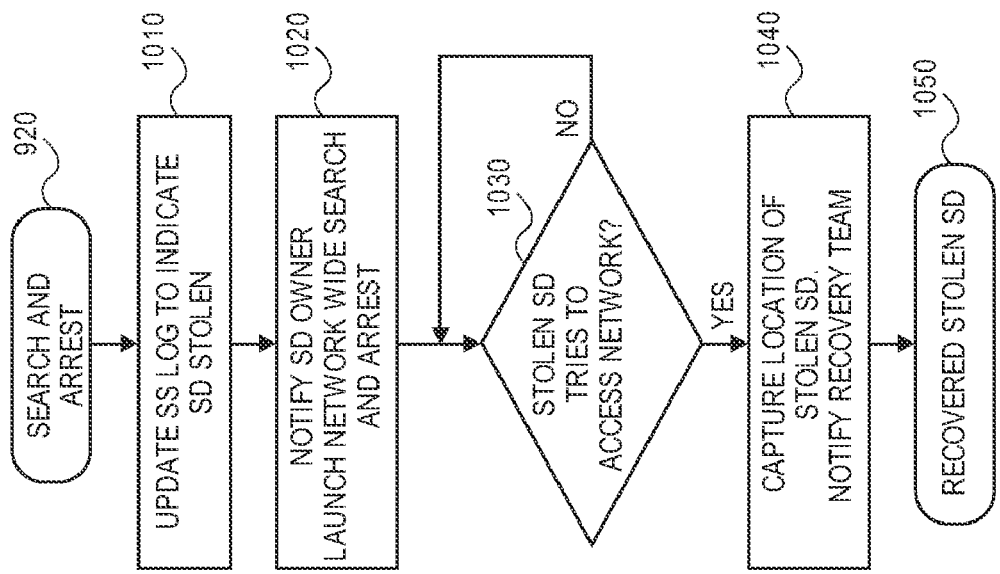
FIG. 10 illustrates an example search and arrest procedure of the Bluetooth™ based security system according to an embodiment of the present invention.

FIG. 10 illustrates an example search and arrest procedure of the Bluetooth™ based security system according to an embodiment of the present invention. When the security server (SS) 110 is in a search and arrest mode at block 920, the security server (SS) 10 updates the log to indicate that the secured device (SD) 130 is lost or stolen at block 1010. Optionally, for a small fee (or no fee) the owner of the locked device (SD) 130 may remotely query the status of the secured device (SD) 130. In addition, the central security server (SS) 110 can notify the owner (or security personnel) if the secured device (SD) 130 is "lost" or "stolen" through unauthorized disconnection, and launch the network wide search and arrest request, via the Internet or other networks to locate the stolen device 130 at block 1020.

If the stolen device 130 ever tries to access the Internet or other networks at block 1030, the security server (SS) 110 may capture the location of the stolen device 130 and notify the recovery team of the location of the stolen device 130 at block 1040 in order to recover the stolen device 130 at block 1050.

Figure 11:
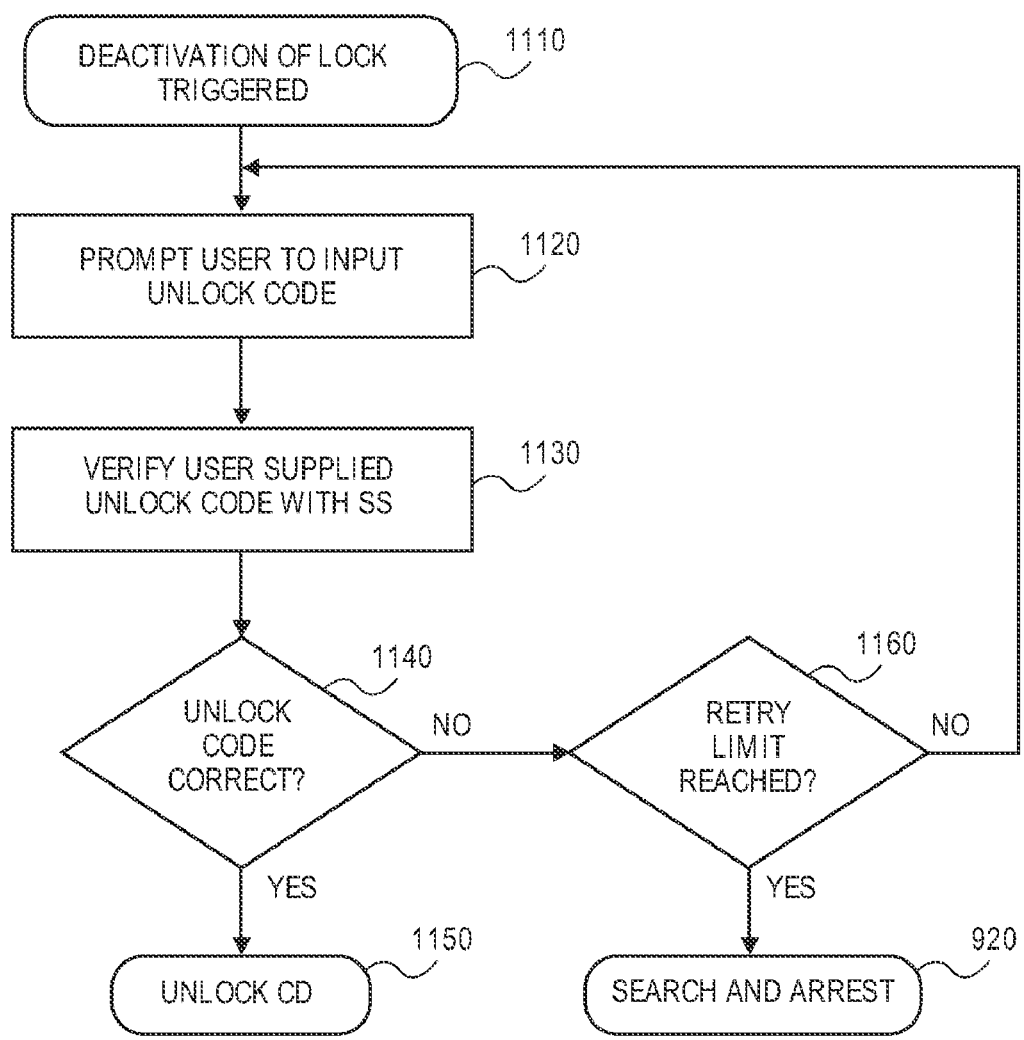
FIG. 11 illustrates an example lock deactivation procedure of the Bluetooth™ based security system according to an embodiment of the present invention.

FIG. 11 illustrates an example lock deactivation procedure of the Bluetooth™ based security system according to an embodiment of the present invention. If the user (owner) of the secured device (SD) 130 desires to disengage the lock and move the secured device (SD) 130 to a different location in the Bluetooth™ based security system, the lock must first be deactivated by the user (owner) with the proper "unlock code". Otherwise, an unauthorized breach event may be triggered, and the security server (SS) 110 may initiate a network wide (or Internet wide) search and arrest request for the secured device (SD) 130.

As shown in FIG. 11, the deactivation of lock may be triggered at the security server (SS) 110 when the secured device (SD) 130 is about to experience a broken BT link with the security server (SS) 110 at block 1110. The security server (SS) 110 may prompt the user at the secured device (SD) 130 to input the unlock code at block 1120. Next, the security server (SS) 110 may verify the user supplied unlock code with the unlock code stored at block 1130. The security server (SS) 110 then determines if the user supplied unlock code matches the stored unlock code at block 1140. If the user supplied unlock code matches the stored unlock code, then the security server (SS) 110 may unlock or disengage the lock with the secured device (SD) 130 at block 1150. At this time, the security server (SS) 110 may check if the secured device (SD) 130 being unlocked is not part of the search and arrest request and then remove the entry for the specified device, making the secured device (SD) 130 free to roam.

However, if the user supplied unlock code does not match the stored unlock code, the security server (SS) 110 may allow the user to re-enter the unlock code two or three times, for example, before making the decision that the user of the secured device (SD) 110 is not the rightful owner of the secured device (SD) 130. As a result, an unauthorized breach event may be triggered the security server (SS) 110 may then initiate a network wide (or Internet wide) search and arrest request for the secured device (SD) 130.

For Bluetooth equipped devices, there is no need to use additional hardware and communications specifically for identification and tracking applications. As described in this invention, the Bluetooth network can be setup to provide access control, tracking and security services of varying complexity without any additional hardware overheads. A security control software system 220B and 330B shown in FIGS. 2-3 may be deployed by an IT administrator to track IT funded notebooks, for example, through site wide Bluetooth Access Points (BTAPs). Such a software system may be a software module provided on a tangible medium, such as a floppy disk or compact disk (CD) ROM, or via Internet downloads, which may be available for an IT administrator to conveniently plug-in or download into the host operating system (OS). Such software modules may also be available as a firmware module or a comprehensive hardware/software module which may be built-in the host. In addition, method steps of FIGS. 7-11 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the Bluetooth based security system as shown in FIG. 1 may be configured differently or employ some or different components than those illustrated. As an alternative short-range wireless communication embodiment, IEEE 802.11b standards systems may be utilized as a wireless local area network (LAN) developed by the Institute of Electrical and Electronic Engineering (IEEE) Institute in order to specify an "over the air" interface between a wireless client and a base station or access point (AP), as well as among wireless clients. Transceivers may use the IEEE 802.11b standard to communicate with transmitters using the IEEE 802.11b standard and with each other to determine position relative to the transmitters. In addition, the security server (SS) 110 and the secured device (SD) 130 as shown in FIGS. 2-3 may be configured differently or employ some or different components than those illustrated without changing the basic function of the invention. Likewise, the Bluetooth transceiver 360 and the GPS receiver 370 as shown in FIGS. 4-6 may also be configured different without changing the basic function of the invention. Further, the software program installed at the security server (SS) 110 and the secured device (SD) 130 may be designed to perform the same task as shown in FIGS. 7-11. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A Bluetooth based security system, comprising:
   a secured device (SD) equipped with a Bluetooth (BT) transceiver;
   a plurality of Bluetooth Access Points (BTAPs) located at designated points to establish a BT link with said secured device (SD) to receive data from and transmit data to said secured device (SD); and
   a security server (SS) connected to all BTAPs and arranged to provide access control and security services for said secured device (SD),
   wherein said security server (SS) to obtain attribute information of said secured device (SD), including an unique device identification (ID) and a last known location of said secured device (SD), to activate a lock with said secured device (SD), and to send location information of a designated BTAP and an unlock code to said secured device (SD), via said designated BTAP.

2. The Bluetooth based security system as claimed in claim 1, wherein said attribute information of said secured device (SD) is captured by the BTAPs and registered in a database of said security server (SS).

3. The Bluetooth based security system as claimed in claim 1, wherein said lock is activated between said secured device (SD) and said security server (SS), via said designated BTAP, upon a request from said secured device (SD) or upon an expiration of a pre-defined timeout value of said security server (SS).

4. The Bluetooth based security system as claimed in claim 1, wherein said security server obtains the unique device identification (ID) from said secured device (SD) and the last known location of said secured device (SD) from the last BTAP that said secured device (SD) connected with.

5. The Bluetooth based security system as claimed in claim 1, wherein said security server (SS) is connected to the Internet or other networks to provide remote monitoring and tracking of said secured device (SD).

6. The Bluetooth based security system as claimed in claim 1, wherein said security server (SS) is configured to notify the owner of said secured device (SD) if said secured device (SD) is lost through unauthorized BT disconnection.

7. The Bluetooth based security system as claimed in claim 1, wherein said secured device (SD) sends the unlock code back to said security server (SS) to disengage the lock, thereby making said secured device (SD) free to roam.

8. The Bluetooth based security system as claimed in claim 1, wherein said security server (SS) comprises: a database arranged to store attribute information of said secured device (SD), including the unique device identification (ID) and the last known location of said secured device (SD);
   a processor configured with a security control software to provide ad-hoe security services, including remote monitoring and tracking of said secured device (SD); and
   an I/O subsystem arranged to install the security control software and change system settings and configurations, and to establish connections with the Internet or other networks to provide security services, including remote monitoring and tracking of said secured device (SD).

9. The Bluetooth based security system as claimed in claim 8, wherein said secured device (SD) comprises:
   a processor;
   a host chipset connected to the processor;
   a memory connected to the host chipset and arranged to contain an operating system (OS) and a security control software for activating/deactivating a lock with the BTAPs; and
   a Bluetooth transceiver connected to the host chipset and arranged to contain an antenna complex for establishing communication with any of the BTAPs for security services.

10. The Bluetooth based security system as claimed in claim 9, wherein said secured device (SD) further comprises:
    a Global Positioning System (GPS) receiver connected to the host chipset and arranged to contain an antenna complex for providing radio positioning and navigation needs, including receiving location information of said secured device (SD) relative to the BTAPs and determining a change in distance between said secured device (SD) and said designated BTAP.

11. The Bluetooth based security system as claimed in claim 9, wherein said Bluetooth transceiver contains the unique device identification (ID) of said secured device (SD) for identification and communication with any one of the BTAPs strategically located at designated points where said secured device (SD) is most likely secured temporarily or permanently.

12. The Bluetooth based security system as claimed in claim 11, wherein said Bluetooth transceiver comprises:
    a radio-frequency (RF) unit arranged to transmit/receive radio waves to/from any one of the BTAPs, via the antenna complex;
    a baseband unit arranged to establish link set-up (control) and support for link management between said secured device (SD) and the BTAPs, including user authentication and link authorization; and
    a Bluetooth data processor arranged to process sample Bluetooth data, including the location of the last BTAP that said secured device (SD) connected with.

13. The Bluetooth based security system as claimed in claim 10, wherein said GPS receiver comprises: a radio-frequency (RF) unit arranged to receive GPS data from a plurality of GPS satellites, via the antenna complex;
    a baseband unit arranged to sample GPS data; and
    a GPS data processor arranged to process sample GPS data relating to the location of said secured device (SD) relative to the BTAPs and determine a change in distance between said secured device (SD) and said designated BTAP.

14. The Bluetooth hated security system as claimed in claim 1, wherein, when said lock is activated between said security server (SS) and said secured device (SD), via said designated BTAP, said security server (SS) transmits the location information (X, Y, Z coordinates) of said designated BTAP and the unlock code to said secured device (SD) for future use, and then said secured device (SD) transmits the unique device ID of said secured device (SD) and the last know location (X, Y, Z coordinates) of said secured device (SD) back to said security server (SS), via said designated BTAP through the BT link.

15. The Bluetooth based security system as claimed in claim 14, wherein said security server (SS) creates log entry in its database, stores the unique device ID of said secured device (SD), the last known location (X, Y, Z coordinates) of said secured device, the time, and the unlock code.

16. The Bluetooth based security system as claimed in claim 15, wherein, if there is an occurrence of an unauthorized breach event during the time when the lock between said security server (SS) and said secured device (SD) is maintained, said security server (SS) operates in a search and arrest mode to notify an appropriate personnel along with the last known position of said secured device (SD) and initiate a network wide (or Internet wide) search and arrest request for said secured device (SD).

17. The Bluetooth based security system as claimed in claim 16, wherein said lock is deactivated if the user at said secured device (SD) input the unlock code, and the user supplied unlock code matches the stored unlock code.

18. A method of providing security services for a secured device equipped with Bluetooth, comprising:
    installing a plurality Bluetooth Access Points (BTAPs) at designated points to establish a BT link with said secured device (SD);
    connecting a security server (SS) to all BTAPs to provide access control and security services for said secured device (SD); and
    after said secured device (SD) establishes a BT link to send and receive data with a designated BTAP, enabling said security server (SS) to obtain attribute information of said secured device (SD), including an unique device identification (ID) and a last known location of said secured device (SD), activate a lock with said secured device (SD), and send location information of a designated BTAP and an unlock code to said secured device (SD), via said designated BTAP.

19. The method as claimed in claim 18, wherein said attribute information of said secured device (SD) is captured by the BTAPs and registered in a database of said security sewer (SS).

20. The method as claimed in claim 18, wherein said lock is activated between said secured device (SD) and said security server (SS), via said designated BTAP, upon a request from said secured device (SD) or upon an expiration of a pre-defined timeout value of said security server (SS).

21. The method as claimed in claim 18, wherein said security server obtains the unique device identification (ID) from said secured device (SD) and the last known location of said secured device (SD) from the last BTAP that said secured device (SD) connected with.

22. The method as claimed in claim 18, wherein said security server (SS) is connected to the Internet or other networks to provide remote monitoring and tracking of said secured device (SD).

23. The method as claimed in claim 18, wherein said security server (SS) is configured to notify the owner of said secured device (SD) if said secured device (SD) is lost through unauthorized BT disconnection.

24. The method as claimed in claim 18, wherein said secured device (SD) sends the unlock code back to said security server (SS) to disengage the lock, thereby making said secured device (SD) free to roam.

25. The method as claimed in claim 18, wherein, when said lock is activated between said security server (SS) and said secured device (SD), via said designated BTAP, said security server (SS) transmits the location information (X, Y, Z coordinates) of said designated BTAP and the unlock code to said secured device (SD) for future use, and then said secured device (SD) transmits the unique device ID of said secured device (SD) and the last know location (X, Y, Z coordinates) of said secured device (SD) back to said security server (SS), via said designated BTAP through the BT link.

26. The method at claimed in claim 18, wherein said security server (SS) creates log entry in its database, stores the unique device ID of said secured device (SD), the last known location (X, Y, Z coordinates) of said secured device, the time, and the unlock code.

27. The method as claimed in claim 18, wherein, if there is an occurrence of an unauthorized breach event during the time when the lock between said security server (SS) and said secured device (SD) is maintained, said security server (SS) operates in a search and arrest mode to notify an appropriate personnel along with the last known position of said secured device (SD) and initiate a network wide (or Internet wide) search and arrest request for said secured device (SD).

28. The method as claimed in claim 18, wherein said lock is deactivated if the user at said secured device (SD) input the unlock code, and the user supplied unlock code matches the stored unlock code.

29. A computer readable medium having stored thereon a plurality of instructions which, when executed by a processor of a security server (SS) providing security services for a secured device (SD) equipped with Bluetooth via a plurality of Bluetooth Access Points (BTAPs), cause the processor to perform:
    establishing a link with said secured device (SD) to receive data from and transmit data to said secured device (SD) via a designated BTAP, when said secured device (SD) is in proximity of said designated BTAP;

obtaining attribute information of said secured device (SD), including an unique device identification (ID) and a last known location of said secured device (SD);

activating a lock with said secured device (SD), via said designated BTAP, upon a request from said secured device (SD) or upon an expiration of a pre-defined timeout value;

sending location information of said designated BTAP and an unlock code to said secured device (SD), via said designated BTAP.

30. The computer readable medium as claimed in claim 29, further enabling, if there is an occurrence of an unauthorized breach event during the time when the lock between said security server (SS) and said secured device (SD) is maintained, operation in a search and arrest mode to notify an appropriate personnel along with the last known position of said secured device (SD) and initiate a network wide (or Internet wide) search and arrest request for said secured device (SD).

* * * * *